(12) United States Patent
Zhao et al.

(10) Patent No.: US 11,226,620 B2
(45) Date of Patent: Jan. 18, 2022

(54) AUTOMATED DRIVING SYSTEMS AND CONTROL LOGIC WITH ENHANCED LONGITUDINAL CONTROL FOR TRANSITIONAL SURFACE FRICTION CONDITIONS

(71) Applicant: GM Global Technology Operations LLC, Detroit, MI (US)

(72) Inventors: Qingrong Zhao, Madison Heights, MI (US); Bakhtiar B. Litkouhi, Washington, MI (US); Nikolai K. Moshchuk, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 485 days.

(21) Appl. No.: 16/271,272

(22) Filed: Feb. 8, 2019

(65) Prior Publication Data
US 2020/0257292 A1   Aug. 13, 2020

(51) Int. Cl.
*G05D 1/00* (2006.01)
*G05D 1/02* (2020.01)
(Continued)

(52) U.S. Cl.
CPC .............. *G05D 1/0088* (2013.01); *B60Q 9/00* (2013.01); *B60W 40/068* (2013.01);
(Continued)

(58) Field of Classification Search
CPC ........ G05D 2201/0213; G05D 1/0223; B60W 40/107; B60W 2720/106; B60W 40/068;
(Continued)

(56) References Cited

U.S. PATENT DOCUMENTS 6,356,838 B1   3/2002 Paul
6,697,730 B2   2/2004 Dickerson
(Continued)

FOREIGN PATENT DOCUMENTS

DE   102014016567 A1   5/2016
WO   0220296 A1   3/2002

OTHER PUBLICATIONS

Doui Hong, et al., "Advanced Smart Cruise Control with Safety Distance Considered Road Friction Coefficient, International Journal of Computer Theory an Engineering", vol. 8, No. 3, Jun. 2016.
(Continued)

*Primary Examiner* — Alan D Hutchinson
*Assistant Examiner* — Andy Schneider
(74) *Attorney, Agent, or Firm* — Quinn IP Law (57) ABSTRACT

Presented are automated driving systems for executing intelligent vehicle operations in mixed-mu road conditions, methods for making/using such systems, and vehicles with enhanced headway control for transitional surface friction conditions. A method for executing an automated driving operation includes a vehicle controller receiving sensor signals indicative of road surface conditions of adjoining road segments, and determining, based on these sensor signals, road friction values for the road segments. The controller determines whether the road friction value is increasing or decreasing, and if a difference between the road friction values is greater than a calibrated minimum differential. Responsive to the friction difference being greater than the calibrated minimum differential and the road friction value decreasing, the vehicle controller executes a first vehicle control action. Conversely, if the friction difference is greater than the calibrated minimum but the road friction value is increasing, the controller responsively executes a second vehicle control action.

20 Claims, 3 Drawing Sheets

(51) Int. Cl.
*B60W 40/068* (2012.01)
*B60W 40/107* (2012.01)
*B60Q 9/00* (2006.01)

(52) U.S. Cl.
CPC ......... *B60W 40/107* (2013.01); *G05D 1/0223* (2013.01); *G05D 2201/0213* (2013.01)

(58) Field of Classification Search
CPC ......... B60W 2552/40; B60W 2720/10; B60W 30/143
See application file for complete search history.

(56) References Cited

U.S. PATENT DOCUMENTS

| | | | |
|---|---|---|---|
| 7,840,427 | B2 | 11/2010 | O'Sullivan |
| 8,170,739 | B2 | 5/2012 | Lee |
| 8,428,843 | B2 | 4/2013 | Lee et al. |
| 8,612,139 | B2 | 12/2013 | Wang et al. |
| 8,849,515 | B2 | 9/2014 | Moshchuk et al. |
| 9,014,915 | B2 | 4/2015 | Chatterjee et al. |
| 9,099,006 | B2 | 8/2015 | Mudalige et al. |
| 9,139,204 | B1 | 9/2015 | Zhao et al. |
| 9,229,453 | B1 | 1/2016 | Lee |
| 9,283,967 | B2 | 3/2016 | Lee |
| 9,487,212 | B1 | 11/2016 | Adam et al. |
| 9,868,443 | B2 | 1/2018 | Zeng et al. |
| 9,971,945 | B2 | 5/2018 | Zhao et al. |
| 9,972,206 | B2 | 5/2018 | Zhao et al. |
| 2009/0030885 | A1 | 1/2009 | DePasquale et al. |
| 2010/0228415 | A1 | 9/2010 | Sunil |
| 2011/0059693 | A1 | 3/2011 | O'Sullivan |
| 2011/0313880 | A1 | 12/2011 | Sunil et al. |
| 2012/0101713 | A1 | 4/2012 | Moshchuk et al. |
| 2012/0239452 | A1 | 9/2012 | Trivedi Aarjav et al. |
| 2013/0032421 | A1 | 2/2013 | Bonne et al. |
| 2013/0035821 | A1 | 2/2013 | Bonne et al. |
| 2013/0054128 | A1 | 2/2013 | Moshchuk et al. |
| 2013/0204676 | A1 | 8/2013 | Hindi et al. |
| 2013/0219294 | A1 | 8/2013 | Goldman-Shenhar et al. |
| 2014/0011522 | A1 | 1/2014 | Lin et al. |
| 2015/0353082 | A1 | 12/2015 | Jin-Woo et al. |
| 2015/0353085 | A1 | 12/2015 | Jin-Woo |
| 2016/0231124 | A1 | 8/2016 | Nickolaou et al. |
| 2016/0320194 | A1 | 11/2016 | Liu et al. |
| 2016/0320195 | A1 | 11/2016 | Liu et al. |
| 2016/0320198 | A1 | 11/2016 | Liu et al. |
| 2016/0321566 | A1 | 11/2016 | Liu et al. |
| 2016/0321771 | A1 | 11/2016 | Liu et al. |
| 2017/0021830 | A1 | 1/2017 | Feldman et al. |
| 2019/0291718 | A1* | 9/2019 | Nilsson ................ B60T 8/1755 |

OTHER PUBLICATIONS

B. K. Yi., S. Moon, "Design of a Full-range ACC with Collision Avoidance/Mitigation Braking", 5th IFAC Symposium on Advances in Automotive Control, 2007.

* cited by examiner

AUTOMATED DRIVING SYSTEMS AND CONTROL LOGIC WITH ENHANCED LONGITUDINAL CONTROL FOR TRANSITIONAL SURFACE FRICTION CONDITIONS

INTRODUCTION

The present disclosure relates generally to motor vehicles with automated driving capabilities. More specifically, aspects of this disclosure relate to automated vehicle driving and warning features, such as adaptive cruise control and forward collision avoidance systems, with enhanced headway control for transitional surface conditions.

Current production motor vehicles, such as the modern-day automobile, are originally equipped with or retrofit to include a network of onboard electronic devices that provide automated driving capabilities that help to minimize driver effort. In automotive applications, for example, the most recognizable type of automated driving feature is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is a computer-automated driving feature that regulates vehicle speed while concomitantly managing fore and aft spacing between the host vehicle and leading/trailing vehicles. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, and other Advanced Driver Assistance Systems (ADAS) and autonomous driving features are also available on many modern-day automobiles.

As vehicle processing, communication, and sensing capabilities continue to improve, manufacturers will persist in offering more system-automated driving capabilities with the aspiration of eventually offering fully autonomous vehicles competent to operate among heterogeneous vehicle types in both urban and rural scenarios. Original equipment manufacturers (OEM) are moving towards vehicle-to-infrastructure (V2I) and vehicle-to-vehicle (V2V) "talking" cars with higher-level driving automation that employ autonomous systems to enable vehicle routing with steering, lane changing, scenario planning, etc. Automated route generation systems utilize vehicle state and dynamics sensors, map and road condition data, and path prediction algorithms to provide path generation with automated lane center and lane change forecasting. Computer-assisted rerouting techniques offer predicted alternative travel routes that may be updated, for example, based on real-time and virtual vehicle data.

Variations in weather conditions, differences in surface materials, and changes in traffic loads all affect the coefficient of friction between the vehicle tires and the roadway. Dry and warm road surface conditions, for example, provide a relatively high coefficient of friction, whereas snow, water or ice-covered road surface conditions provide lower coefficients of friction. Many commercially available CAS, ACC and full speed range adaptive cruise control (FSRACC) systems are only designed to operate on dry road surfaces; drivers are generally advised to not engage these systems in slippery driving conditions. However, such restrictions greatly limit the functionality and operating range of many automated driver assistance systems. Additionally, detection of water, snow or ice on a road of travel is typically determined retroactively by a host vehicle, i.e., utilizing a sensing operation that detects low-friction conditions only after the vehicle is operating in such conditions. As a result, the vehicle is prevented from taking adaptive measures to prospectively acclimate vehicle operations to low-friction road conditions.

SUMMARY

Disclosed herein are automated driving systems and attendant control logic for intelligent vehicle operation in mixed-mu road conditions, methods for constructing and methods for operating such systems, and motor vehicles with enhanced headway warning and control with adaptivity for transitional surface friction conditions. By way of example, there are presented vehicle control algorithms and methodologies that enhance and extend the functionalities of CAS, ACC, and FSRACC with adaptivity to multiple types of road surface conditions (e.g., dry, wet, snowy, icy, etc.), including transitional road condition scenarios, using road condition preview information. While many available automated longitudinal control features operate under the assumption that the vehicle is on a dry surface, the foregoing methods and algorithms fuse road condition preview information with sensed vehicle dynamics and traffic data to extend longitudinal control applicability to diverse road conditions and transitional surface friction scenarios. Using this fused data, the vehicle may implement condition-specific vehicle calibrated operating parameters (e.g., headway distance, speed restrictions, acceleration and deceleration limits, driver warning, etc.) to prospectively adapt vehicle operation to real-time driving conditions.

Attendant benefits for at least some of the disclosed concepts include ADAS architectures, control logic, and intelligent vehicles that incorporate road condition preview data into longitudinal control design to extend CAS/ACC/FSRACC applicability to various road conditions and transitional surface friction scenarios. Disclosed ADAS frameworks implementing road condition preview techniques help to enhance passenger comfort while minimizing risk of collision. Predictive road surface condition techniques help to ensure top level ADAS performance, yielding more consistent and reliable system operation, without requiring the addition of dedicated sensors and hardware.

Aspects of the present disclosure are directed to control algorithms and computer readable media for executing intelligent vehicle operations in mixed-mu road conditions. In an example, a method is presented for controlling an automated driving operation of a motor vehicle crossing adjoining road segments. The foregoing representative method includes, in any order and in any combination with any of the above and below options and features: receiving, via a resident or remote vehicle controller from one or more resident or remote sensing devices, sensor signals indicative of road surface conditions of the road segments; determining, via the vehicle controller based on the received sensor signals, a present (first) road friction value and a previewed (second) road friction value of a current (first) and an upcoming (second) road segment, respectively; determining if the first road friction value is distinct from the second road friction value; if so, responsively determining whether the current road friction value is greater than or less than the previewed road friction value; executing, via the vehicle controller, a first vehicle control action with a powertrain and/or brake system of the motor vehicle responsive to the current road friction value being greater than the previewed road friction value; and executing, via the vehicle controller, a second vehicle control action, distinct from the first vehicle control action, with the powertrain and/or brake system of the motor vehicle responsive to the current road friction value being less than the previewed road friction value.

Other aspects of the present disclosure are directed to motor vehicles with enhanced headway warning and control with adaptivity for transitional surface friction conditions. As used herein, the term "motor vehicle" may include any relevant vehicle platform, such as passenger vehicles (internal combustion engine (ICE), hybrid, full electric, fuel cell, fully or partially autonomous, etc.), commercial vehicles, industrial vehicles, tracked vehicles, off-road and all-terrain vehicles (ATV), motorcycles, planes, etc. In addition, the terms "assisted" and "automated" and "autonomous" may be used interchangeably with respect to any relevant vehicle that may be classified as a Society of Automotive Engineers (SAE) Level 2 to 5 vehicle. SAE Level 0, for example, is generally typified as "unassisted" driving that allows for vehicle-generated warnings with momentary intervention, but otherwise relies solely on human control. By comparison, SAE Level 3 allows for unassisted, partially assisted, and fully assisted driving with sufficient automation for full vehicle control (steering, speed, acceleration/deceleration, etc.), while obliging driver intervention within a calibrated timeframe. At the upper end of the spectrum is Level 5 automation that altogether eliminates human intervention (e.g., no steering wheel, throttle or brake pedals, or shift knob).

In an example, a motor vehicle is presented that includes a vehicle body with a vehicle powertrain (e.g., engine and/or motor, transmission, final drive, powertrain control module (PCM), etc.), a vehicle brake system (e.g., disk/drum brakes, hydraulics, brake system control module (BSCM), etc.), and a network of onboard sensing devices (e.g., radar, LIDAR, infrared, camera, GPS, automated system control module (ASCM), etc.), all of which are mounted to the vehicle body. A resident vehicle controller, which may be embodied as a network of controllers, is communicatively connected to the vehicle powertrain, brake system, and various sensing devices. The resident vehicle controller is programmed to accept, aggregate, filter, and/or save (collectively "receive") sensor signals from one or more sensing devices indicative of road surface conditions of adjoining road segments being driven across by the motor vehicle. Based on the received sensor signals, the vehicle controller analyzes, calculates, call-ups, estimates, and/or retrieves (collectively "determine") road friction values for current and upcoming road segments.

Continuing with the preceding example, the programmable vehicle controller determines if there is a mathematical difference between a current (first) road friction value of the current (first) road segment and a previewed (second) road friction value of the upcoming (second) road segment. If so, the controller responsively determines whether the first road friction value is greater than or less than the second road friction value. Responsive to the current road friction value being greater than the previewed road friction value (e.g., the motor vehicle is executing a high-mu to low-mu transition), the controller executes a first vehicle control action with the vehicle powertrain and/or brake system, for example, to decelerate the vehicle to a desired vehicle speed by the time the vehicle reaches the frictional transition point on the roadway. Conversely, if the first road friction value is less than the second road friction value (e.g., the motor vehicle is executing low-mu to high-mu transition), the vehicle controller automatically executes a second vehicle control action, distinct from the first, with the vehicle powertrain and/or brake system, for example, to increase vehicle speed.

For any of the disclosed vehicles, control systems, and methods, executing a vehicle control action may include: determining a desired vehicle speed at a transition point where the road surface conditions change from the first to the second road friction value; determining a desired braking distance for the motor vehicle to reach the desired vehicle speed by the transition point; and transmitting a command signal with a desired acceleration to the vehicle powertrain and/or brake system to reach the desired vehicle speed within the desired braking distance by the transition point. Optionally, the desired acceleration may be calculated by minimizing a cost function of speed and distance errors, where the cost function is based on desired vehicle speed and desired headway distance.

For any of the disclosed vehicles, control systems, and methods, the vehicle controller may determine when the motor vehicle has reached the desired braking distance to the transition point. In this instance, executing a vehicle control action may be further responsive to a positive determination that the motor vehicle has reached the desired braking distance. As another option, the vehicle controller may determine if the desired acceleration is a negative-acceleration (i.e., deceleration) that is greater than a maximum acceptable deceleration value. If so, the controller may automatically respond by transmitting a warning prompt to a driver of the motor vehicle, e.g., via an electronic instrument cluster or a telematics display unit, indicating the deceleration value is unacceptably high and, optionally, the driver should take appropriate action.

For any of the disclosed vehicles, control systems, and methods, the vehicle controller—after executing the first vehicle control action and contemporaneous with the vehicle reaching the transition point—may initiate a first ADAS control protocol calibrated to a previewed low road friction value. Likewise, after executing the second vehicle control action and contemporaneous with the vehicle reaching the transition point, the vehicle controller may initiate a second ADAS control protocol, distinct from the first ADAS control protocol, calibrated to a previewed high road friction value. In this regard, the vehicle controller may determine a respective switch time for initiating the first/second ADAS control protocol; this switch time may be the same as or different from an actual time at which the vehicle reaches the transition point. Each ADAS control protocol may include a respective vehicle speed operating range, a respective maximum vehicle acceleration, a respective maximum vehicle deceleration, and other condition-specific vehicle operating parameters. If a friction transition is not detected, namely the surface friction difference is zero or less than the calibrated minimum differential, the vehicle controller may initiate or otherwise maintain a first ADAS control protocol calibrated to the current road friction value.

For any of the disclosed vehicles, control systems, and methods, the desired vehicle speed may be calculated (e.g., in a no target vehicle ahead scenario) as a minimum of an operator set vehicle speed, a legal speed limit plus a speed tolerance, and a calibrated maximum speed for the previewed (second) road friction value of the upcoming road segment. As another option, the vehicle controller may: responsive to the first road friction value being greater than the second road friction value, determine if the second road friction value is below a predetermined minimum road surface friction coefficient; and, if so, transmit a warning prompt to the vehicle driver indicating a very low surface friction condition. Executing a vehicle control action may include: determining a current headway range between a current location of the motor vehicle and a target vehicle forward of the motor vehicle; determining a transition time for the motor vehicle to reach the transition point; determining a transition headway range between the target vehicle and the motor vehicle upon reaching at the transition point; and determining a desired vehicle speed at the transition point based on the current headway range, the transition time, and the transition headway range.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," "generally," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Figure 1:
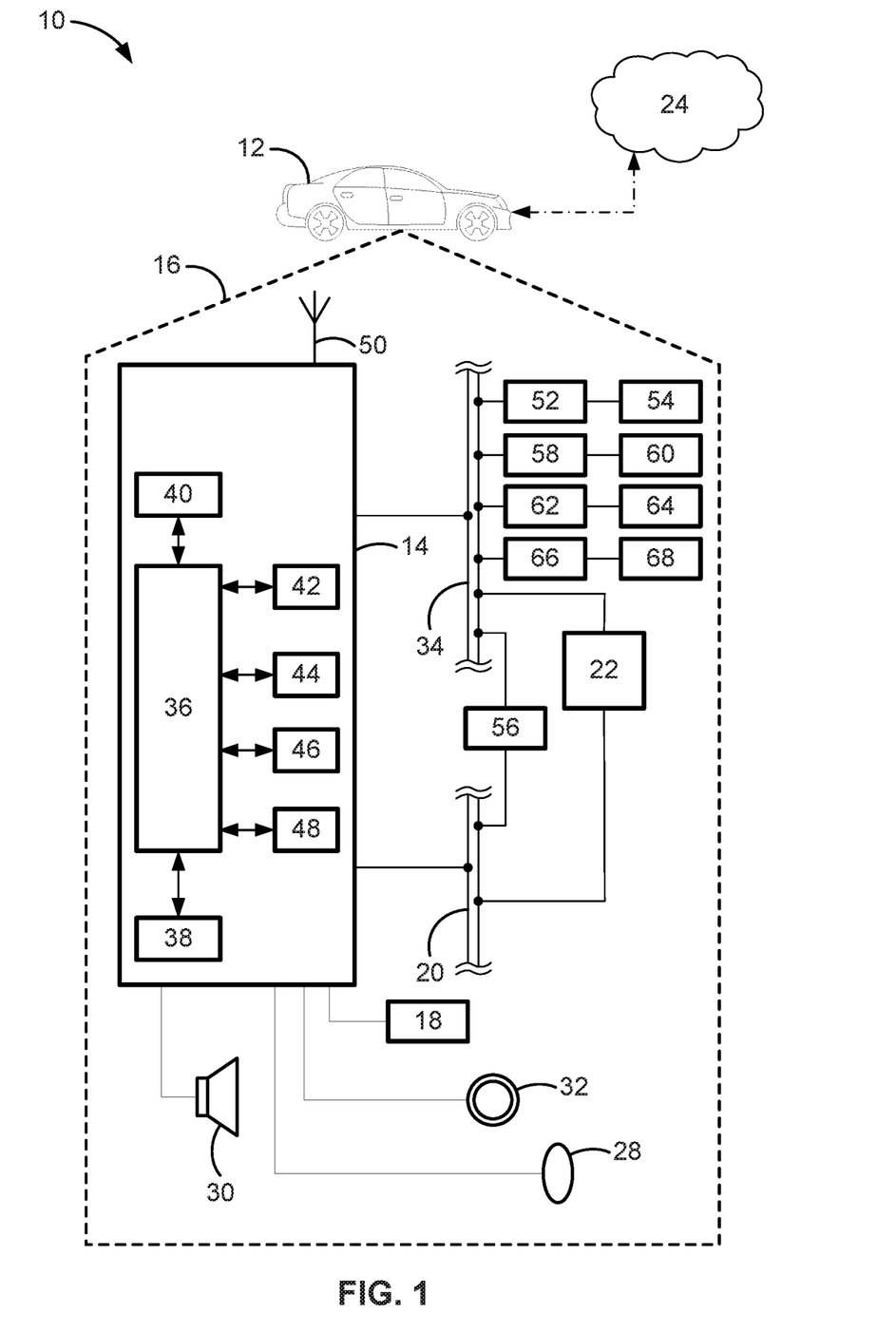
FIG. 1 is a schematic illustration of a representative motor vehicle with a network of in-vehicle controllers, sensing devices, and communication devices for executing automated and/or autonomous driving operations in accordance with aspects of the present disclosure.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more assisted or automated driving operations. The illustrated automobile 10—also referred to herein as "motor vehicle" or "vehicle" for short—is merely an exemplary application with which aspects and features of this disclosure may be practiced. In the same vein, implementation of the present concepts for the specific FSRACC architectures and functions discussed below should also be appreciated as an exemplary application of the novel features disclosed herein. As such, it will be understood that aspects and features of this disclosure may be applied to other ADAS systems, utilized for other autonomous driving operations, and implemented for any logically relevant type of motor vehicle. Moreover, only select components of the FSRACC system and vehicle are shown and will be described in additional detail herein. Nevertheless, the vehicles and system architectures discussed herein may include numerous additional and alternative features, and other available peripheral components, for example, for carrying out the various methods and functions of this disclosure. Lastly, the drawings presented herein are not necessarily to scale and are provided purely for instructional purposes. Thus, the specific and relative dimensions shown in the drawings are not to be construed as limiting.

The representative vehicle 10 of FIG. 1 is originally equipped with a vehicle telecommunication and information ("telematics") unit 14 that wirelessly communicates (e.g., via cell towers, base stations, mobile switching centers (MSCs), etc.) with a remotely located or "off-board" cloud computing system 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, switches, touchpads, keyboards, touchscreens, etc.). Generally, these hardware components 16 function, in part, as a human/machine interface (HMI) to enable a user to communicate with the telematics unit 14 and other systems and system components within the vehicle 10. Microphone 28 provides a vehicle occupant with means to input verbal or other auditory commands; the vehicle 10 may be equipped with an embedded voice-processing unit utilizing human/machine (HMI) technology. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with various systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, controlling engine throttle, engaging/disengaging the brake system, and other automated driving functions. For instance, telematics unit 14 receives and/or transmits data to/from an electronic control unit (ECU) 52, an engine control module (ECM) 54, a powertrain control module (PCM) 56, sensor interface module(s) 58, a brake system control module (BSCM) 60, and assorted other vehicle ECUs, such as a transmission control module (TCM), a climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The various communications devices described above may be configured to exchange data as part of a periodic broadcast in a V2V communication system or a vehicle-to-everything (V2X) communication system, e.g., Vehicle-to-Infrastructure (V2I), Vehicle-to-Pedestrian (V2P), and/or Vehicle-to-Device (V2D).

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. Digital camera 62 may use a charge coupled device (CCD) sensor or other suitable optical sensor to generate images indicating a field-of-view of the vehicle 10, and may be configured for continuous image generation, e.g., at least about 35 images generated per second. By way of comparison, range sensor 64 may emit and detect reflected radio, electromagnetic, or light-based waves (e.g., radar, EM inductive, Light Detection and Ranging (LIDAR), etc.) to detect, for example, presence, geometric dimensions, and/or proximity of an object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameter. Using data from the sensing devices 62, 64, 66, 68, the CPU 36 identifies forward road surface conditions, determines characteristics of such road surface conditions, identifies objects within a detectable range of the vehicle 10, determines attributes of the target object, such as size, relative position, angle of approach, relative speed, etc., and executes automated control maneuvers based on these executed operations.

These sensors are distributed throughout the motor vehicle 10 in operatively unobstructed positions relative to views fore and aft or on port and starboard sides of the vehicle. Each sensor generates electrical signals indicative of a characteristic or condition of a targeted object, generally as an estimate with a corresponding standard deviation. While the operating characteristics of these sensors are generally complementary, some are more reliable in estimating certain parameters than others. Most sensors have different operating ranges and areas of coverage, and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating the range and range rate of the object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

Figure 2:
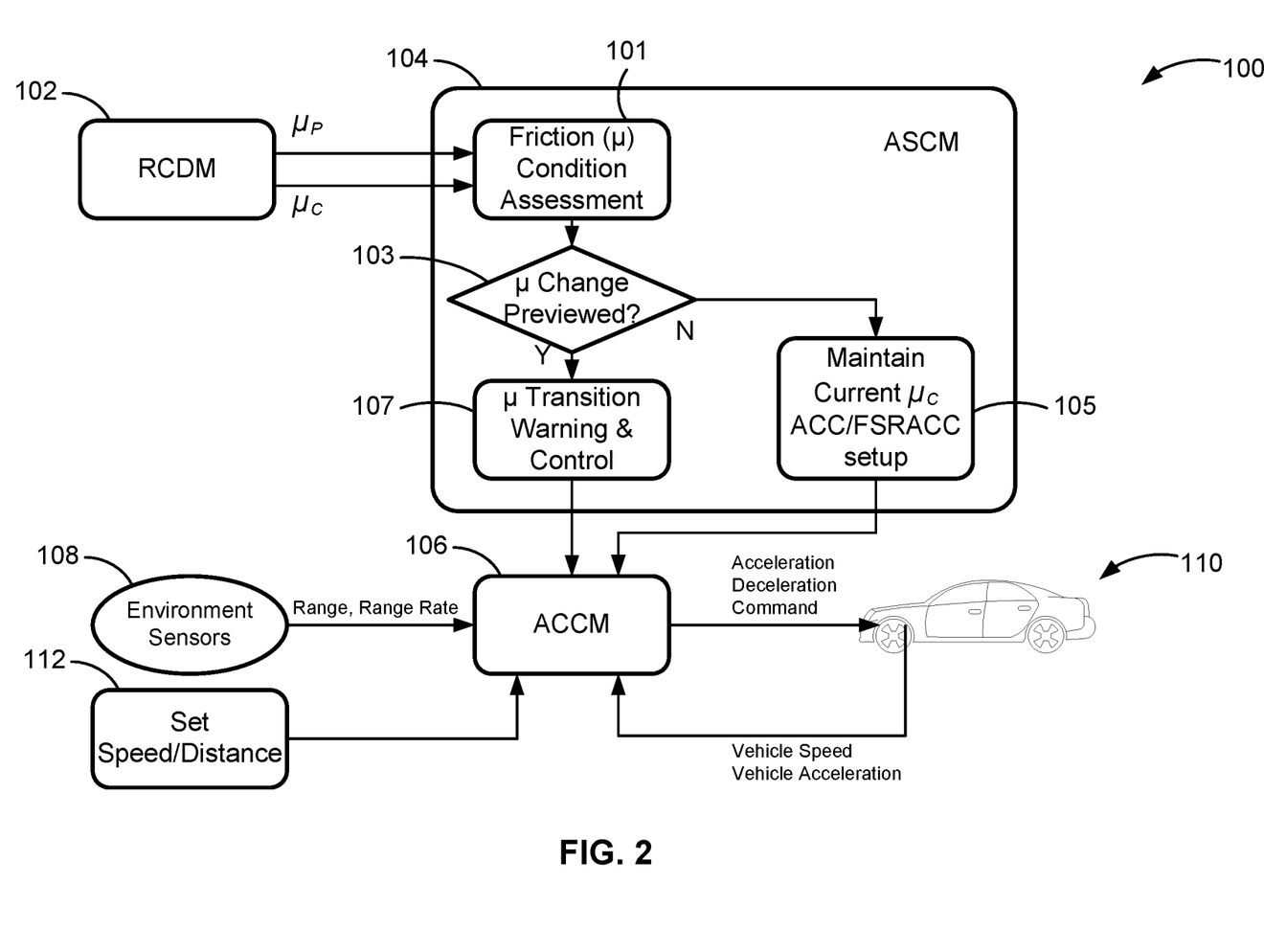
FIG. 2 is a schematic diagram illustrating a representative FSRACC system architecture of a motor vehicle in accordance with aspects of the present disclosure.

Turning next to FIG. 2, there is shown a representative FSRACC system 100 architecture that maintains and adapts a set vehicle speed to accommodate approaching of a forward "target" vehicle by using information related to predicted paths of the subject and forward vehicles, the headway distance between the subject and forward vehicles, and the driver's commands. In the illustrated FSRACC system 100 architecture, a Road Condition Detection Module (RCDM) 102 collects and exchanges information with a master automated system control module (ASCM) 104 that, in turn, communicates with an adaptive cruise control module (ACCM) 106 for executing automated driving operations of a motor vehicle 110. ACCM receives various inputs, such as sensor data from one or more environmental sensors 108, driver inputs from one or more in-vehicle driver input devices 112, as well as any of the other sensor inputs, control signals, and related data described herein. The received driver inputs may be in the nature of a driver-designated vehicle speed and, optionally, a driver-designated headway distance. For an autonomous vehicle application, the foregoing driver inputs may be replaced by or supplemented with a controller-designated vehicle speed and/or a vehicle-designated headway distance. Although differing in appearance, the vehicle 110 of FIG. 2 may take on any of the options and alternatives described above with respect to the vehicle 10 of FIG. 1, and vice versa.

FSRACC system 100 architecture or FIG. 2 is designed to enhance and extend the functionalities of CAS, ACC, and FSRACC with adaptivity to varying types of road surface conditions (e.g., dry, wet, snow, icy, etc.), including challenging transitional road condition scenarios, based on road condition preview information. RCDM 102, for example, is operable to collect all requisite data to generate the necessary road condition preview information for execution of any disclosed vehicle driving operation. Such road condition preview information may be generated by a vision-based, imaging-type sensor network that identifies ice, snow, and/or precipitation dispersed from the surface of the road off of a host and/or target vehicle wheel, as discussed for example in commonly owned U.S. Pat. Nos. 9,971,945 B2 and 9,972,206 B2, both to Qingrong Zhao, et al. Road condition preview information may also be generated using a distributed network of onboard sensing devices to monitor forward roadway segments and derive surface conditions with recursive adaptive learning and validation, as discussed for example in commonly owned U.S. Pat. No. 9,139,204 B2, to Qingrong Zhao, et al. Other commonly owned disclosures discussing evaluating road surface conditions proximate to and forward of a moving vehicle include U.S. patent application Ser. No. 15/677,649, filed on Aug. 15, 2017 (road surface condition classification using single convolutional neural network); Ser. No. 15/681,008, filed on Aug. 18, 2017 (detecting road surface condition using optical imaging of tread prints); Ser. No. 15/845,381, filed on Dec. 18, 2017 (road surface condition detection via panoramic image analysis); and Ser. No. 16/120,616, filed on Sep. 4, 2018 (road condition detection by incorporating environmental illumination). All of the patents and patent applications mentioned in this paragraph are incorporated herein by reference in their respective entireties and for all purposes.

During a cruise control-related driving operation, the FSRACC system 100 may face several issues, including control adaption to accommodate reduced-mu and low-mu surface friction conditions, as well as high-to-low and low-to-high surface friction transitions. For a high-to-low road friction transition, the FSRACC system 100 may derive a desired vehicle speed at a surface friction transitional point to help ensure innocuous speed transitions while maintaining a desired headway gap distance, if any. Achieving this desired vehicle speed at the transitional point may necessitate deriving a deceleration onset time at which the vehicle brake system is activated to ensure a comfortable yet secure rate of deceleration. FSRACC system 100 may also determine an activation time to initiate a low-mu CAS/ACC control protocol for vehicle operation on a reduced-friction road surface. For very low surface friction conditions, FSRACC system 100 may issue a corresponding driver warning and, optionally, disengage ACC operation. For a low-to-high road friction transition, FSRACC system 100 may ascertain when to switch from a low-mu CAS/ACC control protocol to a default or high-mu CAS/ACC control protocol, e.g., after reaching the surface friction transitional point.

With continuing reference to FIG. 2, a goal of ACC/FSRACC may generally be achieved in control by minimizing a cost function of speed/distance errors to obtain a desired acceleration command. Once a desired speed value and a desired headway distance value are determined, for example, a resident or remote vehicle controller, such as CPU 36 of FIG. 1 or ACCM 106 of FIG. 2, may calculate a desired acceleration value to realize a desired speed (e.g., deceleration needed to reduce current vehicle speed to within desired low-mu vehicle speed range by transition point) by minimizing a linear-quadratic optimization cost function of speed and distance errors Jas:

$$J = \int_0^\infty (x^T Q x + u^T R u) dt$$

where u is the desired acceleration represented as a scalar value; $u^T$ is a mathematical transformation format of the scalar value of desired acceleration u (e.g., where the control input variable u=[u1, u2]); x is a vector quantity; $x^T$ is a speed and distance error state function (e.g., a transformation format of x); R and Q are defined weighting matrices. In the above cost function, the speed and distance error state function $x^T$ may be calculated as a function:

$$x^T = [x1 \, x2] = [d_d - d \; v_d - v]$$

where x1 is a distance error state; x2 is a speed error state; $v_d$ is the desired speed; v is a current vehicle speed; d is a current headway distance to a target vehicle forward of the motor vehicle; and $d_d$ is a desired headway distance to the target vehicle forward of the motor vehicle. Weighting matrices R and Q may include weighting values to help correct or otherwise compensate for unequal data redundancy. The parameters Q and R may be set as design parameters to penalize state variables and the control signals. Weighting factors within each matrix (e.g., Q=[$q_1$ $q_2$/$q_3$ $q_4$] and R=r) may be tuned to achieve naturalistic driving. The control input u may be designed to minimize the cost function J to achieve minimal speed error and following distance error. It is envisioned that other mathematical optimization techniques may be used to carry out the disclosed concepts; control input u may take on different equation formats depending, for example, on which specific method is used to minimize the cost function.

RCDM 102 generates sensor signal data indicative of road surface conditions of adjoining road segments across which the host vehicle 110 is currently navigating and predicted to traverse. This data, which is represented in FIG. 2 via a present (first) coefficient of friction $\mu_C$ of a current (first) road surface segment and a previewed (second) coefficient of friction $\mu_P$ of an upcoming (second) road surface segment, is transmitted to the ASCM 104 for aggregation, filtering, analysis and storage. A friction-condition assessment protocol 101 ascertains, from the present and previewed friction values $\mu_C$ and $\mu_P$, which of an assortment of road friction scenarios is estimated to occur such that the FSRACC system 100 can recommend that the ACCM 106 take a corresponding control action. These road friction scenarios may include, as some non-limiting instances: a high-to-low (high risk) surface friction scenario; a high-to-reduced (medium risk) surface friction scenario; a reduced-to-low (low risk) surface friction scenario; a low-to-reduced surface friction scenario; a reduced-to-high surface friction scenario; a low-to-high (low risk) surface friction scenario; and a no-friction-change friction scenario.

Upon completion of the road friction scenario estimate, ASCM 104 executes a friction-change preview protocol 103 to establish whether or not a friction change has been previewed. By way of non-limiting example, the road condition preview information provided by RCDM 102 may be analyzed via ASCM 104 to characterize each road surface segment as one of a plurality of standardized discrete states, such as a dry state, a wet state, a waterlogged state, an icy state, an ice-covered state, a snowy state, a snow-covered state, etc. Each discrete state may be assigned a predetermined friction of coefficient value, which can be represented as a respective nominal mu value $\mu_n$. The previewed friction $\mu_P$ from road condition detection module 102 may be discrete, while the current friction $\mu_C$, if provided by other methods, may be continuous; the comparison error between $\mu_P$ and $\mu_C$ may be truncated to give a discrete state. If no friction change is previewed, a current CAS/ACC control protocol 105 may be maintained; this determination is communicated to the vehicle 110 via ACCM 106. Conversely, if a friction change of sufficient magnitude is previewed, a friction transition warning and control protocol 107 may be called up and executed, an example of which is discussed below with respect to FIG. 3.

Figure 3:
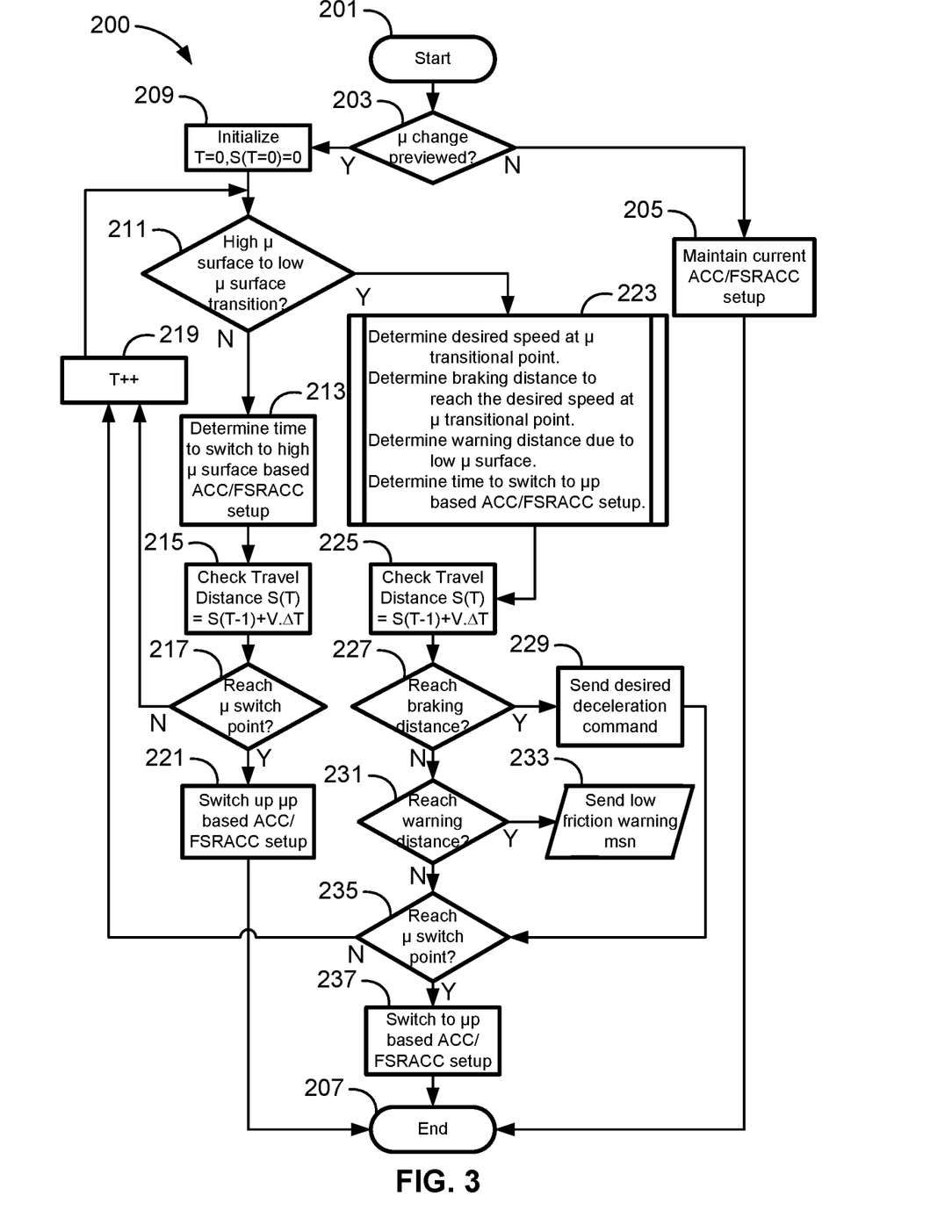
FIG. 3 is a flowchart illustrating a representative enhanced FSRACC headway warning and control protocol with adaptivity for transitional surface friction conditions, which may correspond to memory-stored instructions executed by onboard or remote control-logic circuitry, programmable electronic control unit, or other computer-based device or network of devices in accord with aspects of the disclosed concepts.

With reference now to the flowchart of FIG. 3, an improved method or control strategy for governing a controller-automated driving operation of a motor vehicle, such as an ADAS maneuver of vehicle 10 of FIG. 1 or an FSRACC maneuver of vehicle 110 of FIG. 2, is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by a resident or remote controller, processing unit, control logic circuit, or other module, device and/or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block with processor-executable instructions for a programmable controller or control module or similarly suitable processor to call up an initialization procedure for a mu-based adaptation protocol to govern operation of an automated driving system that controls vehicle headway during an ADAS maneuver. This routine may be executed in real-time, continuously, systematically, sporadically and/or at regular intervals, for example, each 100 milliseconds, etc., during ongoing vehicle operation. As yet another option, terminal block 201 may initialize responsive to a command prompt from a user or a broadcast prompt signal from a backend or middleware computing node tasked with collecting, analyzing, sorting, storing and distributing vehicle data. As part of the initialization procedure at block 201, resident vehicle telematics unit 14 may execute a navigation processing code segment, e.g., to obtain geospatial data, vehicle dynamics data, timestamp and related temporal data, etc., and optionally display select aspects of this data to an occupant of the vehicle 10.

Continuing with the discussion of method 200, memory-stored instructions are executed at decision block 203, e.g., via FSRACC system 100, to determine whether or not a friction change has been previewed, as described above in the discussion of FIG. 2. If a negative determination is returned (Block 203=NO), a presently active CAS/ACC control protocol may be maintained or a CAS/ACC control protocol calibrated to the present road surface friction may be activated at process block 205. At this juncture, the method 200 may proceed to terminal block 207 and terminate, or may loop back to terminal block 201 and run in a continuous loop. Upon determining that a surface friction change is expected to occur (Block 203=YES), the method 200 proceeds to process block 209 and initializes an ECU hardware internal clock (sets time T=0) and a geolocation tracking service (sets real vehicle position S(T=0)=0). This initialization procedure may occur inside the software code through variable setup to track when to start/end certain loop calculations.

Once the ADAS system confirms that a road friction change is expected and responsively initializes any underlying buffering and backend processes, method 200 proceeds to decision block 211 to determine whether the present road friction value of the current road segment is greater than or less than the previewed road friction value of the upcoming road segment. If it is determined that the present road friction value is less than the previewed road friction value, i.e., a low-to-high surface-mu transition is anticipated (Block 211=NO), method 200 proceeds to process block 213 to determine a suitable (first) ADAS switch time to initiate a (first) ADAS control protocol calibrated to the previewed high road friction value. After deriving an appropriate switch time, the method 200 moves to process block 215 to determine the travel distance of the motor vehicle (new vehicle position S(T)=S(T−1)+V·ΔT)) since the ECU hardware's internal clock was initialized at process block 209. Moving to decision block 217, a suitable vehicle controller or dedicated control module estimates whether or not the host vehicle has reached a switch point (e.g., has the switch time elapsed or has the host vehicle reached the transition point). If not (Block 217=NO), a time value is returned and incremented (T++) at process block 219, and the method returns to decision block 211. Conversely, if the vehicle has reached a temporal and/or spatial switch point (Block 217=YES), the vehicle controller responsively initiates the high-mu ADAS control protocol at process block 221; the method thereafter proceeds to terminal block 207 and terminates or resets.

With reference back to decision block 211 of FIG. 3, upon determining that the present road friction value of the road segment being driven across by the vehicle is greater than the previewed road friction value of an upcoming road segment, i.e., a high-to-low surface-mu transition is anticipated (Block 211=YES), method 200 provides memory-stored processor executable instructions at predefined process block 223 for the ADAS system (e.g., via FSRACC system 100 of FIG. 2) to: (1) determine a desired vehicle speed at the mu transitional point; (2) determine a desired braking distance to reach the desired vehicle speed by the mu transitional point; (3) determine a suitable (second) switch time to initiate a (second) ADAS control protocol calibrated to the previewed low road friction value; and (4) determine a warning distance for a driver to take action (e.g., braking) when the requested desired deceleration magnitude is greater than an allowed maximum deceleration magnitude due to a very low previewed surface friction. Each of the foregoing control operations will be discussed in further detail hereinbelow.

Upon completion of the assorted predefined operations enumerated above with respect to process block 223, the method 200 moves to process block 225 to determine the travel distance of the motor vehicle (new vehicle position S(T)=S(T−1)+V·ΔT)) since the ECU hardware's internal clock was initialized at process block 209. Moving to decision block 227, a suitable vehicle controller or dedicated control module estimates whether or not the host vehicle has reached the desired braking distance. If so (Block 227=YES), the method 200 proceeds to process block 229 and issues one or more corresponding command signals to the vehicle powertrain and/or brake system to achieve the desired acceleration/deceleration and thereby reach the desired vehicle speed within the desired braking distance by the transition point. Responsive to a determination that the braking distance has not been reached by the host vehicle (Block 227=NO), method 200 determines, at decision block 231, whether or not the host vehicle has reached a low-mu insufficient braking distance threshold. If so (Block 231=YES), a low friction warning message is transmitted to the driver at input/output block 233. This message may include a prompt for the driver to take immediate action in light of the expected drop in road surface friction. Alternatively, the vehicle 10, 110 may execute an automated driving maneuver to ameliorate the expected friction drop.

Prior to or contemporaneous with determining that the host vehicle has reached an insufficient braking distance threshold in light of impending low-mu road conditions (Block 231=NO), a suitable vehicle controller or dedicated control module estimates whether or not the host vehicle has reached a switch point (e.g., has the switch time elapsed or has the host vehicle reached the transition point), at decision block 235. If not (Block 235=NO), a time value is returned and incremented (T++) at process block 219, and the method returns to decision block 211. However, if the vehicle has reached a temporal and/or spatial switch point (Block 235=YES), the vehicle controller responsively initiates the low-mu ADAS control protocol at process block 237; the method thereafter proceeds to terminal block 207 and terminates or resets.

When a low road surface friction is previewed, a host vehicle currently traversing a road segment with a high surface friction and sufficient distance should be able to reduce the vehicle speed through a comfortable level of braking to a desired vehicle speed by the transitional point to ensure safe and comfortable driving on the low-μ surface. If it is determined that the vehicle has to decelerate with more than a maximum allowable deceleration on the high-μ surface in order to reach the desired vehicle speed by the transition point, a warning message may be generated to warn the driver to take action; the vehicle controller may automatically disable ACC/FSRACC. Once the vehicle is sufficiently close to the transition point, the low-μ ACC/FSRACC setup is timely switched for a smooth transition.

Calculating a desired vehicle speed $v_d$ at the friction transitional point may take on many approaches. For a high-to-low surface friction transition with no target vehicle forward of the host vehicle, the subject vehicle's current vehicle speed V may be adjusted to a reduced vehicle speed $V_d$ at the transition point to be no more than a maximum speed allowed on the low-μ surface, as calculated by:

$$V_d(\mu_p) = \min(V_{set}, V_{spd_{limit}} + \Delta 1, V_{maxspd(\mu_p)})$$

where $V_d(\mu_P)$ is the desired vehicle speed; $V_{set}$ is an operator set vehicle speed; $V_{spd\_limit}$ is a legal speed limit of the upcoming road segment; $\Delta 1$ is a vehicle-calibrated speed tolerance (e.g., +/−5 mph); and $V_{madspd(\mu p)}$ is a vehicle-calibrated maximum speed on the road surface condition of the upcoming road segment.

For a high-to-low surface friction transition with a detected target vehicle forward of the host vehicle, the vehicle controller will: monitor a current target vehicle speed $V_t$ and a current host vehicle speed $V_h$; calculate if target vehicle speed $V_t$ is less than host vehicle speed $V_h$; and ascertain a transition distance D between the host vehicle and the transition point, and a range distance R between the host vehicle and the target vehicle. From these determinations, the vehicle controller may quantify an estimated time Δt1 for the subject vehicle to reach the transitional point and a desired vehicle speed $V_d$ at the transitional point to ensure the host vehicle does not collide with the target vehicle. The following time-to-collision inverse $TTC^{-1}$ may be employed to determine which control strategy to use in a given scenario:

$$TTC^{-1} = \frac{\dot{R}}{R} = \frac{V_t - V_h}{R}$$

If $TTC^{-1} > 0$, the vehicle controller will initiate a surface-μ transition control strategy calibrated to scenarios where no target vehicle is detected. On the other hand, if it is determined that $TTC^{-1} < 0$, a target-detected desired vehicle speed is determined for the transitional point. To ensure a secure range distance at the transitional point, a minimum allowable range distance between the two vehicles on low-μ surface may be designated as:

$$d_{safe} = L_{min}(\mu_p) + T_s(\mu_p)V_t + \frac{V_t^2 - V_d^2}{2a_{max}(\mu_p)} \quad (1)$$

where $L_{min}(\mu_p) + T_s(\mu_p)V_t$ represents a steady state following distance, and $(V_t^2 - V_d^2)/(2a_{max}(\mu_p))$ represents a transient speed adjustment distance with a maximum allowed deceleration. The actual distance between host and target vehicles when the host vehicle reaches the transition point may be set larger than or equal to a minimum allowable distance $d_{safe}$:

$$(R - D) + V_t \cdot \Delta t 1 \geq d_{safe} \quad (2)$$

$$\text{where } \Delta t 1 = \frac{2D(V_d - V_h)}{V_d^2 - V_h^2}; V_t = V_h + \dot{R}$$

$$V_d \leq f(V_h, \dot{R}, D, R) \quad (3)$$

Equation (3) can be obtained based on Equations (1) and (2), where f is a function of the current host vehicle speed $V_h$, range R, range rate $A = \dot{R}$, and transition distance D. In this instance, desired host vehicle speed may be determined as:

$$V_d = \min(V_{set}, V_{maxspd(\mu_p)}, f(V_h, \dot{R}, D, R) - \Delta)$$

where Δ is a small speed adjustment value.

For a high-to-low road surface friction transition where there may be insufficient braking distance to achieve a desired vehicle speed by the transition point, it may be advantageous for the vehicle controller to determine if and when to transmit a warning prompt to a vehicle occupant to take corrective action and, optionally, if and when to automate remediating action, such as temporarily disabling ACC/FSRACC operation. Once a desired host vehicle speed for the transitional point is determined, the vehicle controller may determine a braking distance to reach the desired vehicle speed and a warning distance for the driver to take action to reduce speed to an appropriate level by the transitional point. Braking distance $d_{brake}$ for comfortable braking may be calculated as:

$$d_{brake}(\mu_c) = V_h \tau_{sys\_delay} + \frac{V_d^2 - V_h^2}{a_{com}(\mu_c)} + L_{safe}(\mu_c)$$

where $a_{com}(\mu_c)$ is a calibrated comfortable deceleration amount for a previewed surface friction $\mu_C$; $\tau_{sys\_delay}$ is a system total time delay; $V_h$ is the subject vehicle speed; and $L_{safe}$ is a calibrated secure distance. A warning distance $d_{warning}$ for a driver to manually brake due to a high-to-low friction transition may be calculated as:

$$d_{warning}(\mu_c) = V_h(\tau_{sys\_delay} + \tau_{drv\_delay}) + \frac{V_d^2 - V_h^2}{a_{max}(\mu_c)} + L_{safe}(\mu_c)$$

where $\tau_{drv\_delay}$ is a driver delay; $a_{max}(\mu_c)$ is a maximum deceleration calibrated at a current road friction $\mu_c$; $L_{safe}(\mu_c)$ is a vehicle-calibrated minimum distance based on the current road friction $\mu_c$; and $T_{sys\_delay}$ is a system delay.

In at least some applications, a maximum acceleration/deceleration value may be derived from a surface friction-dependent max longitudinal force For a given vehicle maneuver, this max longitudinal force may be retrieved from a memory-stored, vehicle-calibrated look-up table derived from vehicle testing plots of slip rate ($\lambda$) versus longitudinal tire force ($F_{T\_x}$). Vehicle longitudinal dynamics may be mathematically quantified as:

$$ma = F_x + mV_y r - \frac{1}{2}\rho C_d A v_x^2 - mg \sin\theta$$

where the longitudinal slip ratio at each wheel in acceleration is calculated as:

$$\lambda_i = \frac{R\omega_i - V_x}{R\omega_i}, \text{ and}$$

$$a_{max}(\mu) = F_{xmax}(\lambda, \mu)/m + V_y r - \frac{1}{2m}\rho C_d A V_x^2 - g\sin\theta$$

where $\rho$ is a current air density; $C_d$ is a current drag coefficient; A is a frontal area; $\theta$ is a grade angle of the roadway; a is acceleration; $V_x$, $V_y$ are vehicle longitudinal and lateral velocities, respectively; r is a vehicle yaw rate; m is a vehicle mass; w is a wheel angular velocity; R is an effective wheel radius; and $F_x = F_{xf} + F_{xr}$ is a sum of front and rear longitudinal axle forces, respectively.

Road surface friction-based transition warning and control for a high-to-low friction transition may further comprise determining an appropriate time frame for when to activate a suitable ACC/FSRACC control protocol that is calibrated to the previewed road friction. For such a transition, the switch time for activating the previewed-friction based ACC/FSACC setup may incorporate a buffer time value to compensate for system delay and to ensure timely switch to the low-friction based control strategy. A switch point and size of a transition zone adjoining the transition point may be calculated as:

$$d_{tzone} = V_h \tau_{sys_{delay}} + \Delta L$$

where $d_{tzone}$ is the size of the transition zone; $\Delta L$ is a high-to-low tolerance length; and $\tau_{sys\_delay}$ is a system delay offset value. If a vehicle distance to the transition point D is equal to the transition zone $d_{tzone}$, the vehicle controller will have to switch to a previewed low-friction based ACC/FSACC setup. Conversely, for a low-to-high road surface friction transition, the previewed high-friction-based ACC/FSACC setup may be scheduled with a delay to help ensure the host vehicle has fully exited to low-friction roadway segment. In this instance:

$$d_{tzone} = L_{veh} + \Delta L$$

where $L_{veh}$ is a vehicle length; and $\Delta L$ is a low-to-high tolerance length. If the host vehicle travels past the transition point, the vehicle controller automatically switches to high-friction based control strategy. It should be understood that many of the above equations and formulas, such as the equations to proposed to calculate $V_d$, $d_{brake}$, $d_{warning}$, $d_{tzone}$, etc., are proposed as exemplary ways of implementing aspects of the disclosed concepts. As such, these features may be determined using other suitable approaches as long as that approach follows the control philosophy here for transitional surface conditions.

As indicated above, aspects of the disclosed concepts cover systems, methodologies, and vehicle control algorithms that enhance and extend the operation of longitudinal distance control, such as CAS/ACC/FSRACC, to transitional road condition scenarios. Aspects of the disclosed concepts also cover methods to determine desired host vehicle speeds at road surface transitional points with and without detected forward obstructions, such as target vehicles, pedestrians, animals, etc. Other aspects of the disclosed concepts cover methods to determine an appropriate braking distance for reaching the transition point with a desired vehicle speed. Additional aspects of the disclosed concepts cover methods to determine if and when to issue a driver warning for an upcoming low road friction scenario, and methods to determine when to switch to an ACC/FSACC setup based on a new road friction after transition.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling an automated driving operation of a motor vehicle crossing first and second road segments, the method comprising:
   receiving, via a vehicle controller of the motor vehicle from a sensing device, sensor signals indicative of road surface conditions of the first and second road segments;
   determining, via the vehicle controller based on the received sensor signals, first and second road friction values of the first and second road segments, respectively;
   determining if the first road friction value is different from the second road friction value;
   responsive to the first road friction value being different from the second road friction value, determining whether the first road friction value is greater than or less than the second road friction value;
   executing, via the vehicle controller, a first vehicle control action with a powertrain and/or a brake system of the motor vehicle responsive to the first road friction value being greater than the second road friction value;
   executing, via the vehicle controller, a second vehicle control action with the powertrain and/or the brake system of the motor vehicle responsive to the first road friction value being less than the second road friction value;
   initiating, after executing the first vehicle control action and approximately when the vehicle reaches a transition point where the road surface conditions change from the first road friction value to the second road friction value, a first Advanced Driver Assistance System (ADAS) control protocol calibrated to the second road friction value; and
   initiating, after executing the second vehicle control action and approximately when the vehicle reaches the transition point, a second ADAS control protocol, different from the first ADAS control protocol, calibrated to the second road friction value.

2. The method of claim 1, wherein executing the first vehicle control actions includes:
   determining a desired vehicle speed at the transition point where the road surface conditions change from the first road friction value to the second road friction value;
   determining a desired braking distance and a desired acceleration for the motor vehicle to reach the desired vehicle speed by the transition point; and
   transmitting a command signal with the desired acceleration to the powertrain and/or the brake system of the motor vehicle to reach the desired vehicle speed within the desired braking distance by the transition point.

3. The method of claim 2, further comprising determining if the motor vehicle has reached the desired braking distance, wherein executing the first vehicle control action is further in response to the motor vehicle reaching the desired braking distance.

4. The method of claim 2, further comprising:
   determining if the desired acceleration is a deceleration value that is greater than a maximum acceptable deceleration value; and
   transmitting, responsive to the deceleration value being greater than the maximum acceptable deceleration value, a warning prompt to a driver of the motor vehicle indicating the deceleration value is unacceptably high.

5. The method of claim 2, further comprising calculating the desired acceleration by minimizing a cost function of speed and distance errors J as:

$$J = \int_0^\infty (x^T Q x + u^T R u) dt$$

where u is the desired acceleration; $u^T$ is a mathematical transformation format of the desired acceleration u at the transition point T; $x^T$ is a speed and distance error state function; x is a vector quantity; R and Q are defined weighting matrices.

6. The method of claim 5, wherein the speed and distance error state function $x^T$ is determined as a function:

$$x^T = [x1\ x2] = [d_d - d\ \ v_d - v]$$

where x1 is a distance error state; x2 is a speed error state; $v_d$ is the desired vehicle speed; v is a current vehicle speed; d is a current headway distance to a target vehicle forward of the motor vehicle; and $d_d$ is a desired headway distance to the target vehicle.

7. The method of claim 1, further comprising:
   determining a first switch time to initiate the first ADAS control protocol; and
   determining a second switch time to initiate the second ADAS control protocol.

8. The method of claim 1, wherein the first and second ADAS control protocols each includes: a respective vehicle speed operating range; a respective maximum vehicle acceleration; and a respective maximum vehicle deceleration.

9. The method of claim 1, wherein executing the first and second vehicle control actions each includes determining a respective desired vehicle speed at a transition point where the road surface conditions change from the first road friction value to the second road friction value, wherein the desired vehicle speed is calculated as:

$$V_d(\alpha_p)=\min(V_{set}, V_{spd_{limit}}+\Delta 1, V_{maxspd(\mu_p)})$$

where $V_d(\mu_p)$ is the desired vehicle speed; $V_{set}$ is an operator set vehicle speed; $V_{spdlimit}$ is a legal speed limit of the second road segment; $\Delta 1$ is a speed tolerance; and $V_{maxspd(\mu p)}$ is a calibrated maximum speed on the road surface condition of the second road segment.

10. The method of claim 1, further comprising:
determining, via the vehicle controller responsive to the first road friction value being greater than the second road friction value, if the second road friction value is below a predetermined minimum road surface friction coefficient; and
transmitting, via the vehicle controller responsive to the second road friction value being below the predetermined minimum road surface friction coefficient, a warning prompt to a driver of the motor vehicle indicating a very low surface friction condition.

11. The method of claim 1, wherein executing the first and second vehicle control actions each includes:
determining a current headway range between a current location of the motor vehicle and a target vehicle forward of the motor vehicle;
determining a transition time for the motor vehicle to reach a transition point where the road surface conditions change from the first road friction value to the second road friction value;
determining a transition headway range between the target vehicle and the motor vehicle upon reaching the transition point; and
determining a desired vehicle speed at the transition point based on the current headway range, the transition time, and the transition headway range.

12. The method of claim 1, further comprising executing, via the vehicle controller, a predefined ADAS control protocol calibrated to the first road friction value responsive to a surface friction difference between the first and second road friction values being either zero or less than a calibrated minimum differential.

13. A motor vehicle comprising:
a vehicle body;
a vehicle powertrain mounted to the vehicle body;
a vehicle brake system mounted to the vehicle body;
a network of onboard sensing devices mounted to the vehicle body; and
a vehicle controller mounted to the vehicle body and operatively connected to the vehicle powertrain, the vehicle brake system, and the network of onboard sensing devices, the vehicle controller being programmed to:
receive, from one or more of the sensing devices, sensor signals indicative of road surface conditions of adjoining first and second road segments being driven across by the motor vehicle;
determine, based on the received sensor signals, a first road friction value of the first road segment and a second road friction value of the second road segment;
determine if the first and second road friction values are different from each other;
if the first and second road friction values are different, determine whether the first road friction value is greater than or less than the second road friction value;
execute a first vehicle control action with the vehicle powertrain and/or the vehicle brake system of the motor vehicle responsive to the first road friction value being greater than the second road friction value;
execute a second vehicle control action with the vehicle powertrain and/or the vehicle brake system of the motor vehicle responsive to the first road friction value being less than the second road friction value;
determine a desired vehicle speed at a transition point where the road surface conditions change from the first road friction value to the second road friction value;
determine a desired braking distance for the motor vehicle to reach the desired vehicle speed by the transition point;
transmit a command signal with a desired acceleration to the vehicle powertrain and/or the vehicle brake system to meet the desired vehicle speed within the desired braking distance by the transition point;
determine if the desired acceleration is a deceleration value that is greater than a maximum acceptable deceleration value; and
transmit, responsive to the deceleration value being greater than the maximum acceptable deceleration value, a warning prompt to a driver of the motor vehicle indicating the deceleration value is unacceptably high.

14. A motor vehicle, comprising:
a vehicle body;
a vehicle powertrain mounted to the vehicle body;
a vehicle brake system mounted to the vehicle body;
a network of onboard sensing devices mounted to the vehicle body; and
a vehicle controller mounted to the vehicle body and operatively connected to the vehicle powertrain, the vehicle brake system, and the network of onboard sensing devices, the vehicle controller being programmed to:
receive, from one or more of the sensing devices, sensor signals indicative of road surface conditions of adjoining first and second road segments being driven across by the motor vehicle;
determine, based on the received sensor signals, a first road friction value of the first road segment and a second road friction value of the second road segment;
determine if the first and second road friction values are different from each other;
if the first and second road friction values are different, determine whether the first road friction value is greater than or less than the second road friction value;
execute a first vehicle control action with the vehicle powertrain and/or the vehicle brake system of the motor vehicle responsive to the first road friction value being greater than the second road friction value;
execute a second vehicle control action with the vehicle powertrain and/or the vehicle brake system of the motor vehicle responsive to the first road friction value being less than the second road friction value;

initiate, after executing the first vehicle control action and after the vehicle reaches a transition point where the road surface conditions change from the first road friction value to the second road friction value, a first Advanced Driver Assistance System (ADAS) control protocol calibrated to the second road friction value; and initiate, after executing the second vehicle control action and after the vehicle reaches the transition point, a second ADAS control protocol, different from the first ADAS control protocol, calibrated to the second road friction value.

15. The motor vehicle of claim 14, wherein executing the first vehicle control actions includes:

determining a desired vehicle speed at the transition point where the road surface conditions change from the first road friction value to the second road friction value;

determining a desired braking distance and a desired deceleration acceleration for the motor vehicle to reach the desired vehicle speed by the transition point; and transmitting a command signal with the desired acceleration to the vehicle powertrain and/or the vehicle brake system to meet the desired vehicle speed within the desired braking distance by the transition point.

16. The motor vehicle of claim 15, wherein the vehicle controller is further programmed to calculate the desired acceleration by minimizing a cost function of speed and distance errors J as:

$$J=\int_0^\infty (x^T Q x + u^T R u) dt$$

where u is the desired acceleration; $u^T$ is a desired acceleration value at the transition point; $x^T$ is a speed and distance error state function; x is a current vehicle location; R and Q are defined weighting matrices.

17. The motor vehicle of claim 15, wherein the vehicle controller is further programmed to:

determine if the desired acceleration is a deceleration value that is greater than a maximum acceptable deceleration value; and transmit, responsive to the deceleration value being greater than the maximum acceptable deceleration value, a warning prompt to a driver of the motor vehicle indicating the deceleration value is unacceptably high.

18. The motor vehicle of claim 14, wherein the vehicle controller is further programmed to:

determine a first switch time to initiate the first ADAS control protocol; and determine a second switch time to initiate the second ADAS control protocol.

19. The motor vehicle of claim 14, wherein the first and second ADAS control protocols each includes: a respective vehicle speed operating range; a respective maximum vehicle acceleration; and a respective maximum vehicle deceleration.

20. The motor vehicle of claim 14, wherein the vehicle controller is further programmed to calculate a desired acceleration by minimizing a cost function of speed and distance errors J as:

$$J=\int_0^\infty (x^T Q x\ u^T R u) dt$$

where u is the desired acceleration; $u^T$ is a desired acceleration value at the transition point; $x^T$ is a speed and distance error state function; x is a current vehicle location; R and Q are defined weighting matrices.

* * * * *